(12) United States Patent
Haeberlein

(10) Patent No.: US 10,000,300 B2
(45) Date of Patent: Jun. 19, 2018

(54) DEVICE FOR HOLDING AND ALIGNING A USEFUL COMPONENT, IN PARTICULAR A SPACE TRAVEL COMPONENT

(71) Applicant: Airbus DS GmbH, Taufkirchen (DE)

(72) Inventor: Matti Haeberlein, Kressbronn (DE)

(73) Assignee: Airbus DS GmbH, Taufkirchen (DE)

( * ) Notice: Subject to any disclaimer, the term of this patent is extended or adjusted under 35 U.S.C. 154(b) by 360 days.

(21) Appl. No.: 14/634,970

(22) Filed: Mar. 2, 2015

(65) Prior Publication Data
US 2015/0246737 A1    Sep. 3, 2015

(30) Foreign Application Priority Data
Mar. 3, 2014 (DE) .......... 10 2014 002 732

(51) Int. Cl.
| | | |
|---|---|---|
| G02B 27/64 | (2006.01) | |
| B64G 1/24 | (2006.01) | |
| F16M 13/02 | (2006.01) | |
| B64G 1/66 | (2006.01) | |
| B64G 1/26 | (2006.01) | |

(52) U.S. Cl.
CPC ............. *B64G 1/24* (2013.01); *B64G 1/66* (2013.01); *F16M 13/022* (2013.01); *B64G 1/26* (2013.01)

(58) Field of Classification Search
CPC ............................ G06F 1/1616; G06F 1/1681
USPC .............. 248/544, 550, 645, 672, 673, 674, 248/220.21, 222.52, 223.31, 223.41, 248/224.51, 224.7, 224.8, 288.31, 288.51; 359/557, 554
See application file for complete search history.

(56) References Cited

U.S. PATENT DOCUMENTS

| 4,060,315 | A | | 11/1977 | Heinz | |
|---|---|---|---|---|---|
| 4,177,964 | A | * | 12/1979 | Hujsak | B64G 1/646 114/250 |
| 4,423,850 | A | * | 1/1984 | Bass | F16M 11/125 248/180.1 |

(Continued)

FOREIGN PATENT DOCUMENTS

| JP | 5-104475 A | 4/1993 |
|---|---|---|
| WO | WO 2011/104518 A1 | 9/2011 |

OTHER PUBLICATIONS

European Search Report issued in counterpart European Application No. 15000538.7 dated Aug. 3, 2015, with Statement of Relevancy (Seven (7) pages).

*Primary Examiner* — Terrell L McKinnon
*Assistant Examiner* — Michael McDuffie
(74) *Attorney, Agent, or Firm* — Crowell & Moring LLP

(57) ABSTRACT

A device for holding and aligning a component includes a first and a second housing part and a tilting device. The first housing part is arranged on a first end for stationary arrangement on a carrier and the second housing part is arranged on a second end for connection to the useful component. The first end and the second end are on opposite sides of the device in relation to a longitudinal axis. The tilting device mechanically connects the first and the second housing parts to one another and enables a defined alignment and holding of the relative position of the second housing part in relation to the first housing part. The actuator of the tilting device is a number of wires made of a shape-memory alloy. A length of each of the number of wires is individually adjustable by a respective determination of the resistance, which can be processed as a control variable in a control loop.

14 Claims, 3 Drawing Sheets

(56) References Cited

U.S. PATENT DOCUMENTS

Figure 1:
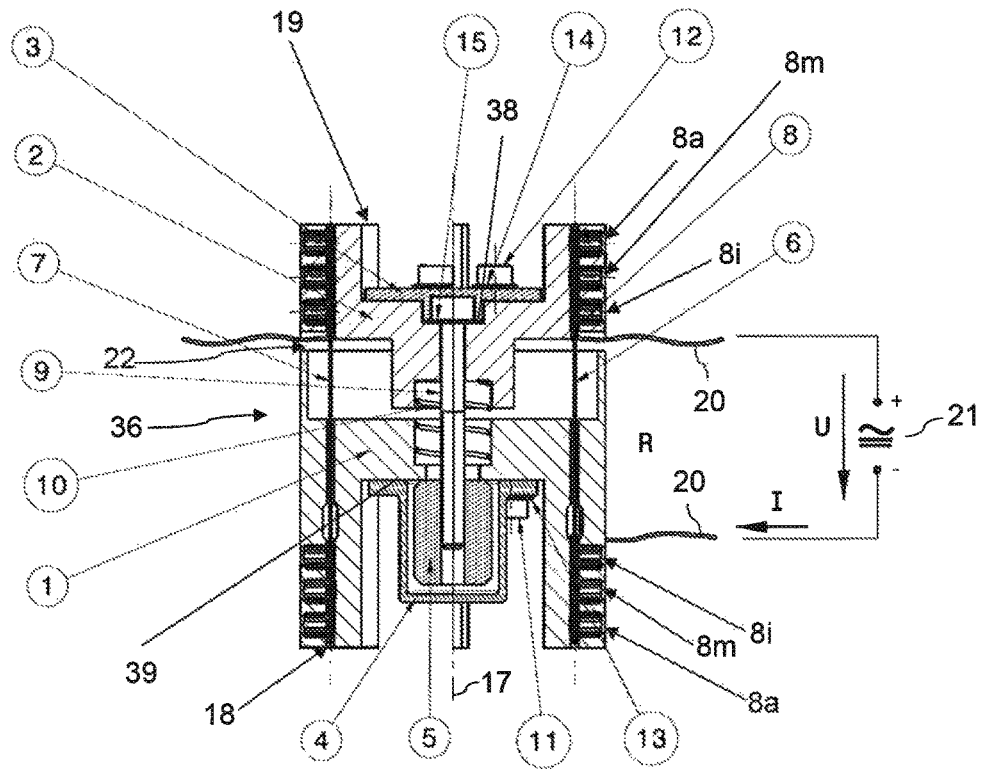

| | | | | |
|---|---|---|---|---|
| 4,431,333 A * | 2/1984 | Chandler | | B64G 1/641 244/172.4 |
| 4,471,448 A * | 9/1984 | Williams | | G01B 11/27 356/138 |
| 5,203,199 A * | 4/1993 | Henderson | | G01P 21/00 73/1.39 |
| 5,239,361 A | 8/1993 | Burch | | |
| 6,170,795 B1 * | 1/2001 | Wayne | | G02B 7/004 248/288.31 |
| 6,307,678 B2 * | 10/2001 | Kosaka | | G02B 27/646 359/554 |
| 6,478,434 B1 * | 11/2002 | Streetman | | G02B 7/183 318/568.17 |
| 6,677,673 B1 * | 1/2004 | Hitchcock | | H01L 23/473 257/685 |
| 7,777,952 B2 * | 8/2010 | Homme | | G02B 27/646 359/554 |
| 7,961,412 B2 * | 6/2011 | Iwasaki | | A61B 1/0008 348/65 |
| 8,073,320 B2 * | 12/2011 | Topliss | | G02B 7/005 396/133 |
| 8,611,734 B2 * | 12/2013 | Lim | | G03B 5/02 348/208.11 |
| 8,727,548 B1 * | 5/2014 | Obrien | | G02B 7/182 359/872 |
| 8,753,031 B2 * | 6/2014 | Stefan | | A61B 90/50 248/181.1 |
| 8,910,914 B2 * | 12/2014 | Bigeh | | F16M 11/14 248/188.1 |
| 2001/0022688 A1 | 9/2001 | Kosaka et al. | | |
| 2001/0023915 A1 * | 9/2001 | Hailson | | F16C 11/106 248/288.51 |
| 2007/0103555 A1 * | 5/2007 | Eromaki | | H04N 5/2254 348/208.4 |
| 2014/0230572 A1 * | 8/2014 | Mankame | | G01L 1/04 73/862.621 |
| 2015/0369223 A1 * | 12/2015 | Hallila | | A61B 17/66 60/527 |

* cited by examiner

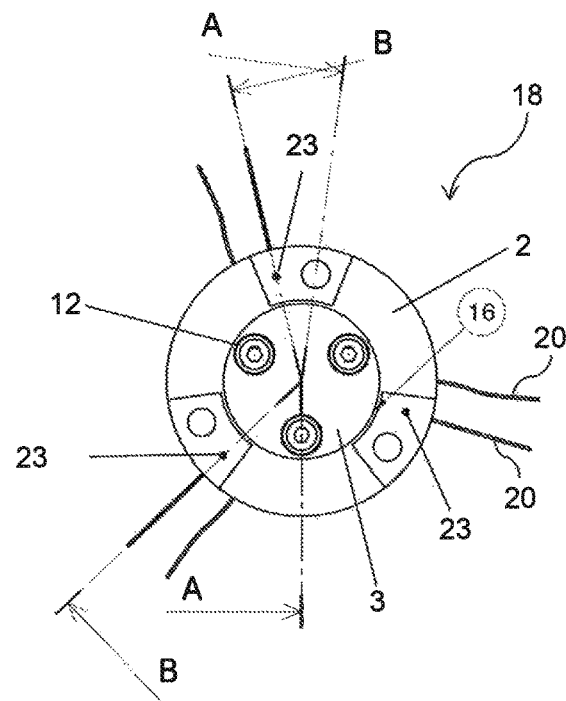
Fig. 3
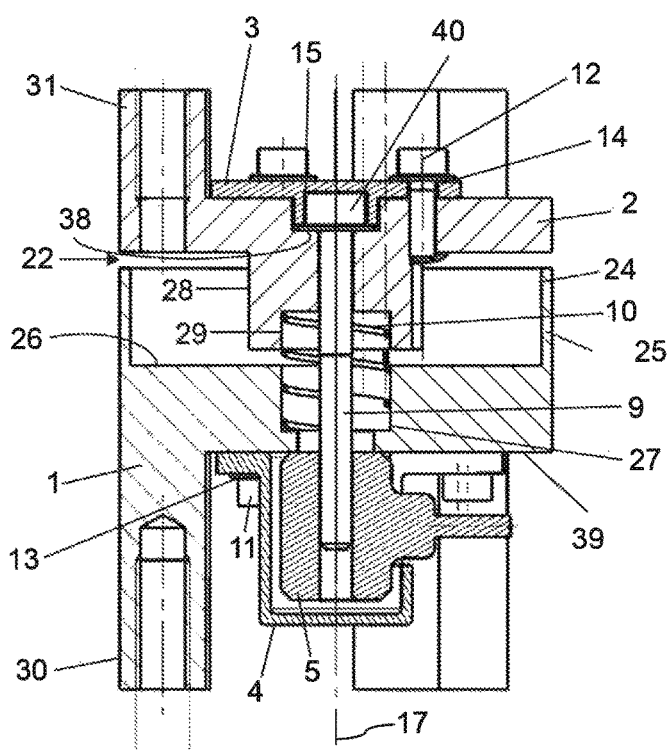
Fig. 4  A-A

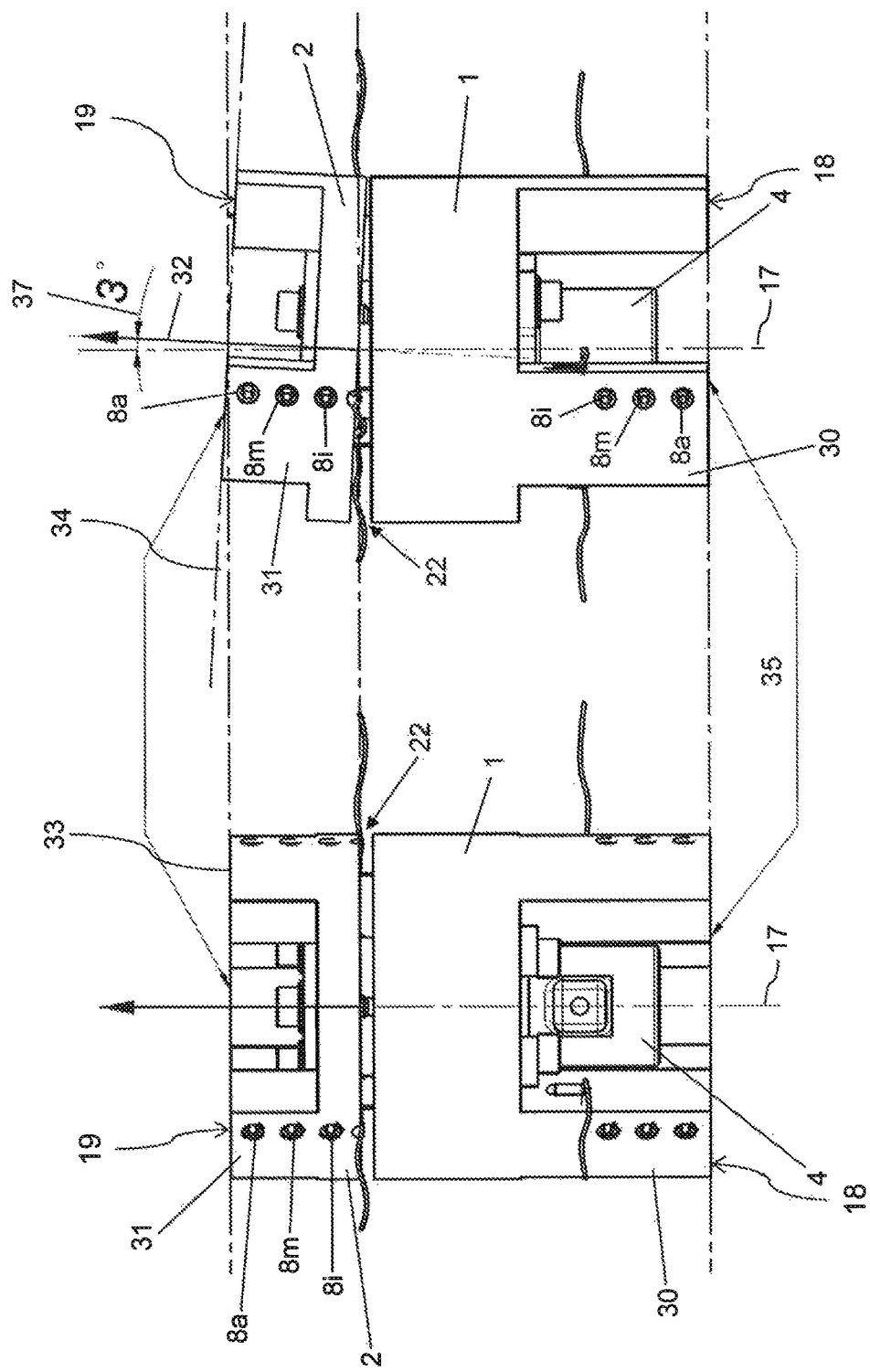

DEVICE FOR HOLDING AND ALIGNING A USEFUL COMPONENT, IN PARTICULAR A SPACE TRAVEL COMPONENT

CROSS-REFERENCE TO RELATED APPLICATIONS

The present application claims priority under 35 U.S.C. § 119 to German patent application 10 2014 002 732.5, filed Mar. 3, 2014, the entire disclosure of which is herein expressly incorporated by reference.

BACKGROUND AND SUMMARY OF THE INVENTION

Exemplary embodiments of the invention relate to a device for holding and aligning a useful component, in particular of an optical element or an electrical or chemical thrust nozzle.

Such a device is used in space travel for setting and regulating so-called tip/tilt and focus positions, for example, of thrust nozzles or optical elements. The adjustment is performed, for example, with the aid of stepping motors. The position of a respective stepping motor is determined by additional sensors, which are generally optical sensors. Depending on the number of the required stepping motors, possibly required transmissions, and the suspensions thereof, such a device for holding and aligning can have a significant weight. The control, the scalability, and the possible adaptations for different systems are accordingly complex. Such devices are thus susceptible to faults and require extensive and costly tests before use.

Exemplary embodiments of the present invention are directed to a device for holding and aligning a useful component, which is used in space travel in particular, this device being structurally and/or functionally improved.

According to exemplary embodiments of the present invention a device for holding and aligning a useful component, in particular an optical element or an electrical or chemical thrust nozzle, comprises a first and a second housing part and a tilting device. The first housing part is implemented on a first end for stationary arrangement on a carrier, in particular a space vehicle. The second housing part is implemented on a second end for connecting the useful component. The first end and the second end come to rest, in relation to a longitudinal axis of the device, on opposing sides or ends of the device. The tilting device mechanically connects the first housing part and the second housing part to one another and enables a defined alignment and holding of the relative position of the second housing part in relation to the first housing part. The tilting device comprises, as an actuator, a number of wires made of a shape-memory alloy, wherein the length of each of the number of wires is adjustable individually by a respective determination of the resistance, which can be processed as a control variable in a control loop.

The invention therefore uses the electro-thermal-mechanical behavior of a number of wires made of a shape-memory alloy (SMA) as a motor or actuator. The resistance behavior of the shape-memory alloy is fed back as a control variable in a control loop and is therefore used as an inherent position sensor.

Therefore, the change of the specific resistance of the number of wires during the phase transition from martensite into austenite is used, wherein the resistance is processed as a control variable of the tilting device. The extension or shortening (and therefore its absolute length) of a respective wire and therefore the position of the wire in the lateral direction in space can be determined via the dedicated change of the resistance.

Such a device has a high weight savings in relation to a conventional device having stepping motors, transmissions, and sensors. The device can be scaled and adapted in a simple manner. It may therefore be used for various useful components without extensive and costly verification tests.

In particular, it is possible to dispense with position sensors, since, as described, the inherent properties of a shape-memory alloy are used to determine the position of the individual actuators in space.

In addition, the invention has the following further advantages:

The complexity of the mechatronic system is low due to the omission of many electronic components. The shape-memory alloys enable the greatest possible mechanical energy usage with the least possible structural space. The device has a high level of robustness and reliability for holding and aligning the useful component.

The first and the second housing parts can be implemented as at least sectionally cylindrical. The longitudinal axis of the device can then be considered to be the rotational axis A defined alignment is to be understood, originating from a plane (x-y plane), which is perpendicular to the longitudinal axis of the device, as a (more or less) arbitrary inclination of the plane in relation to the longitudinal axis (z axis).

According to one embodiment, the number of wires is connected in each case in a mechanically fixed manner to the first and the second housing parts. More precisely, a respective first end of a respective wire is connected to the first housing part and a respective second end is connected to the second housing part. The location of the number of wires between the first and the second parts is thus known, so that a precise position for determination is enabled.

The number of wires can consist of a nickel-titanium alloy. A nickel-titanium alloy (NiTi) is also referred to as Nitinol. Nitinol is the intermetallic phase NiTi with an ordered cubic crystal structure differing from that of titanium and nickel. It consists in large part of nickel and a further large part of titanium. The alloy is corrosion-resistant and high strength, and also pseudo-elastically deformable. The transformation temperature may be influenced via the alloy ratio.

According to a further embodiment, the number of wires is arranged in parallel to the longitudinal axis of the device. Furthermore, it is advantageous if the number of wires is of equal thickness. The change of the length of one or more wires then results in an alignment of the second housing part in relation to the first housing part in dependence on the arrangement between the first and the second housing parts.

It is furthermore advantageous if the tilting device comprises at least one spring element, which attempts to press the first and the second housing part away from one another, and/or a cone-socket connection element, which enables arbitrary pivoting of the second housing part in relation to the first housing part. In conjunction with the at least one spring element, which is embodied in particular as a compression spring, and/or the cone-socket connection element, the alignment and reset of the alignment of the second housing part in relation to the first housing part can occur in a defined manner.

According to a further advantageous embodiment, the first and the second housing parts are connected to one another via a release mechanism, which blocks a relative movement of the first and the second housing parts in a starting configuration and enables a relative movement of the first and the second housing parts in an operating configuration. An alignment of the second housing part in relation to the first housing part is thus enabled in the operating configuration. In the starting configuration, the first and the second housing parts are rigidly connected to one another, which is advantageous during the start of a space vehicle in orbit, for example, and to avoid the introduction of excessive forces into the device, in particular into the tilting device having the wires.

According to a further embodiment, the first and the second housing parts are spaced apart from one another via the tilting device at least in the operating configuration. In this way, the relative movement of the second housing part in relation to the first housing part is enabled. In contrast, the first and the second housing parts can press against one another in the starting configuration. The relative position of first and second housing parts in the starting configuration is determined by the structure of the release mechanism. The contact of the two housing parts ensures, during the start of a space vehicle, that no relative movement of the two housing parts in relation to one another is possible, which could thus possibly damage the number of wires and further components of the tilting device.

In order not to damage the wires before the operation of the device, the number of wires is not tensioned in the starting configuration. In contrast, it is provided that after triggering of the release mechanism, the at least one spring element tensions the number of wires.

The tilting movement of the second housing part in relation to the first housing part can be implemented in various ways. Each of the variants described hereafter has advantages in this case with respect to the precision and the system status requirement, wherein all variants can be used equivalently with regard to the use of a number of wires made of a shape-memory alloy as an actuator while using the resistance behavior as a control variable in a control loop.

In the first variant, the tilting device comprises a spring, which is pre-tensioned between the first and the second housing parts, and which is arranged essentially in the region of the longitudinal axis of the device. The wires are tensioned in parallel along the rotor axis by the spring, which is embodied as a compression spring. Furthermore, after the triggering of the release mechanism, the device can be moved from the starting configuration into the operating configuration by the compression spring.

Furthermore, in this variant the tilting device comprises three wires, which are arranged equidistantly, i.e., in a 120° arrangement, on a circle about the longitudinal axis of the device. It is thus possible to incline the second housing part in relation to the first housing part in an arbitrary manner.

In the second and third variants, the cone-socket connection element is arranged centrally in the region of the longitudinal axis of the device instead of the compression spring.

In the second variant, the tilting device comprises two wires, wherein the two wires are arranged on a circle offset by 90° about the longitudinal axis in relation to one another. A compression spring is associated with each of the wires which, in relation to the longitudinal axis, is arranged on the circle opposite to the associated wire. It is furthermore provided that the spring associated with one wire counteracts the wire on the opposite side in the same lever ratio. This principle acts about both axes, which are defined by the arrangement of the two wires on the circuit about the longitudinal axis and the associated compression springs. That is, one axis is formed by a line on which a first of the wires, the associated compression spring, and the intersection point with the longitudinal axis lie. The other axis is formed by another line, on which the other (second) of the wires, the associated compression spring, and the intersection point with the longitudinal axis lie.

In the third variant, the tilting device comprises four wires, which are distributed equidistantly on a circle about the longitudinal axis of the device. This means the four wires are arranged offset to one another by 90° about the longitudinal axis. Each two wires are connected to one another in the same lever ratio as a lever via the centrally arranged cone-socket connection element as a rocker. These wires operate antagonistically. In this case, the applied tension can be interrupted in any arbitrary position, whereby unpowered operation is possible.

BRIEF DESCRIPTION OF THE DRAWING FIGURES

Figure 2:
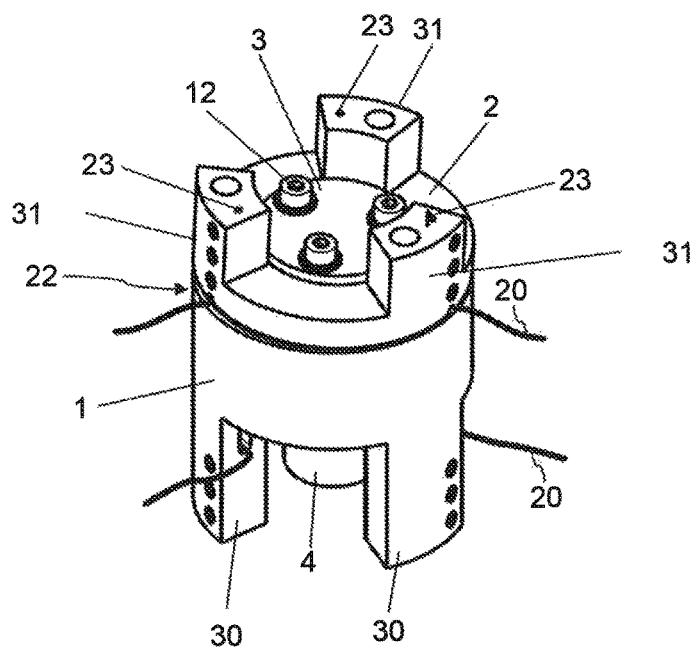

The invention will be explained in greater detail hereafter on the basis of an exemplary embodiment in the drawings. In the figures:

FIG. 1 illustrates a cross-sectional illustration through an exemplary embodiment of a device according to the invention for holding and aligning a useful component (not shown), FIG. 2 illustrates a perspective illustration of the device from FIG. 1, FIG. 3 illustrates a top view of the device illustrated in FIG. 1, FIG. 4 illustrates an illustration of the device from FIG. 3 in section along line A-A, and FIGS. 5a and 5b each illustrate a cross-sectional illustration of a non-aligned and an aligned device.

DETAILED DESCRIPTION

An exemplary embodiment of one possible variant of multiple variants of a device for holding and aligning a useful component is described in connection the following figures. The device carries, for example, an arbitrary electrical or chemical thruster (thrust nozzle) or an optical element to be aligned. The device itself is arranged, for example, on a space travel vehicle, for example, a satellite. In this environment, the device represents a so-called "thruster pointer", which is provided for so-called tip/tilt pointing tasks of electrical and chemical engines or optical elements.

The device consists of a first, lower housing part 1, a second, upper housing part 2, and a tilting device 36, which mechanically connects the first and second housing parts 1, 2 to one another, and which enables defined alignment and holding of the relative position of the second housing part 2 in relation to the first housing part 1. The first, lower housing part 1 can be fastened with its first end 18 on a carrier, for example, a satellite. A connection to the useful component, i.e., an electrical or chemical thrust nozzle (not shown in greater detail) or an optical element to be aligned, is performed at a second end 19 of the second housing part 2, which is located on the side of the second housing part 2 facing away from the first housing part 1.

As can be readily inferred from FIGS. 1, 2, 4, and 5, the first end 18 of the first housing part 1 and the second end 19 of the second housing part 2 come to rest at opposite ends of the device with respect to a longitudinal axis 17. As can be inferred without difficulty in particular from FIGS. 2 and 3, the first and the second housing parts 1, 2 are implemented as circular in a top view (cf. FIG. 3). The longitudinal axis 17 therefore corresponds to a rotational axis of the device.

As is most clearly apparent from FIGS. 5*a* and 5*b*, the first end of the first, lower housing part 1 lies in a fastening plane 35, which is perpendicular to the longitudinal axis 17, to be fastened to the carrier (not shown in greater detail). The second end 19 of the second, upper housing part 2 lies in a fastening plane 33. The fastening plane 33 is perpendicular to the longitudinal axis 17, as long as the second housing part 2 is located in a starting position in relation to the first housing part 1 (FIG. 5*a*). In this position, the fastening plane 33 is not inclined or pivoted in relation to the fastening plane 35. In the scope of the present description, this is understood as "no alignment". In contrast, if the second housing part 2 is pivoted in relation to the first housing part 1 (cf. FIG. 5*b*), the fastening plane 33 is thus perpendicular to an inclination axis 32 and corresponds to an inclined plane 34. The angle 37 enclosed between the inclination axis 32 and the longitudinal axis 17 is the result of an actuation of the tilting device 36, to align the second housing part 2 in relation to the first housing part 1 in a defined manner (in the example, by 3°). The useful component is arranged on the fastening plane 33.

The first and the second housing parts 1, 2 are made of a metal, in particular aluminum. The housing parts 1, 2 can be produced, for example, by lathing and/or milling.

In the variant illustrated in the figures, the tilting device 36 comprises three wires 6, 7, 16, of equal length and equal thickness, made of a shape-memory alloy and a centrally arranged, pre-tensioned (compression) spring 10. The wires 6, 7, 16 are arranged offset by 120° on a circle about the longitudinal axis, i.e., equidistant to one another. The three wires 6, 7, 16 extend in this case in parallel to one another and in parallel to the longitudinal axis 17. The wires 6, 7 can be seen best from the cross-sectional illustration of FIG. 1. The arrangement of the three wires 6, 7, 16 can be seen from the perspective illustration of FIG. 2 and FIG. 3, which shows a top view of the device according to the invention.

The wires 6, 7, 16 are arranged in a respective channel 23 provided in the first and the second housing parts 1, 2 (cf. FIGS. 2 and 3). The channel sections associated with a respective wire in the first and the second housing parts 1, 2 are arranged in this case along a common axis, which extends in parallel to the longitudinal axis 17. As can be seen best from the cross-sectional illustration of FIG. 1, the wires 6, 7, 16 are clamped, both in the first housing part 1 and also in the second housing part 2, using three threaded pins 8 in each case in the associated channel 23. A total of six threaded pins 8 are provided per wire.

The threaded pins 8 are, as can be seen well from FIGS. 1 and 2, provided in projections 30, 31 extending in the longitudinal direction, which have a cross section in the form of a circular ring segment. In this case, the projection 30 for receiving and fixing a wire refers to the projection of the first, lower housing part 1 associated with a respective wire 6, 7, 16. The projection 31 for receiving and fixing a respective wire 6, 7, 16 is associated with the second, upper housing part 2.

Threaded pins 8*a* at the respective free end of a respective wire 6, 7, 16 are tightened with full torque. A respective middle threaded pin 8*m* is tightened with half torque. The "inner" threaded pin 8*i*, which is associated in each case with the other housing part, is only tightened hand-tight.

The wires 6, 7, 16 are formed, for example, from a nickel-titanium alloy, also known as Nitinol. The wires 6, 7, 16 form an actuator in a control loop. For this purpose, each of the wires 6, 7, 16 is connected on its opposing ends to respective connection lines 20, which are in turn connected to a power source 21. This is schematically shown in FIG. 1. The change of the specific resistance of a respective wire during the phase transition from martensite into austenite is used as a control variable to control the length change of a respective wire 6, 7, 16, i.e., a shortening or a lengthening. The currently measured resistance, which results from the applied voltage and the measured current, is used as a control variable to set the length change. Therefore, the expansion of a respective wire 6, 7, 16 is used, via the dedicated change of the resistance, to exactly determine the position in the lateral direction, i.e., in the direction of the longitudinal axis 17.

This means the electro-thermal-mechanical behavior of the wires 6, 7, 16, which consist of a shape-memory alloy, is used as a motor. The resistance behavior of the wires made of shape-memory alloy is fed back as a control variable into a control loop and is therefore used as an inherent position sensor.

For the alignment of the second housing part 2 in relation to the first housing part 1, as is schematically shown in FIGS. 5*a* and 5*b*, the compression spring 10 which ensures a pre-tension is also required in addition to an actuation of at least one of the wires 6, 7, 16.

As described, the spring 10 is arranged centrally between the two housing parts 1, 2. The first housing part 1 has, on the end facing toward the second housing part 2, a pot-shaped recess 24. The depth of the recess 24 is dimensioned such that a projection 28 of the second housing part 2, which faces toward the first housing part 1, can plunge nearly completely into the recess 24. The height of the projection 28 therefore approximately corresponds to the height of a circular wall 25 defining the recess 24. On the bottom 26, the recess 24 has a further, smaller recess 27. The spring 10 is supported on the bottom of the recess 27. The diameter of the recess 27 corresponds approximately to the external diameter of the spring 10. Corresponding thereto, the projection 28 has a recess 29, into which the spring plunges with its other, free end. The spring is supported on the bottom of the recess 29.

The first and the second housing parts 1, 2 are connected to one another via a release mechanism. The release mechanism ensures that, in a starting configuration of the device, a relative movement of the first and the second housing parts 1, 2 is blocked and therefore no inclination or alignment of the second housing part in relation to the first housing part is possible. A relative movement of the first and the second housing parts 1, 2 is first enabled in an operating configuration, in which the release mechanism is triggered. The release mechanism can be recognized best in FIGS. 1 and 4.

In the starting configuration, which is not shown in the figures, the two housing parts 1, 2 press against one another with their surfaces facing toward one another. The wires 6, 7, 16 are not yet tensioned in the starting configuration.

For this purpose, the release mechanism has a bolt 9, which is inserted through a coaxially extending borehole in the first and the second housing parts 1, 2. As can be seen well from the cross-sectional illustrations of FIGS. 1, 4, and 5, the bolt 9 passes in this case through the spring 10. On its end facing toward the second housing part 2, the bolt 9 has a nut 40 or a bolt head, which applies a force to the second housing part 2, either itself or via a washer 15. The nut 40 of the bolt 9 lies (nearly) completely in a recess 38 of the second housing part 2 in this case. With its other, free end, the bolt 9 protrudes beyond a top side 39 of the first housing part facing toward the first end 18. An actuator 5 is arranged there in a housing 4 of the release mechanism.

The housing 4 is connected via screws 11 and associated washers 13 to the first housing part 1. The actuator 5 can be electrically actuated and ensures in this case, by way of an application of force to the bolt, that it breaks. In order to prevent the section of the bolt 9 connected to the second housing part 2 from detaching from the second housing part 2, a fixation element 3 for the release mechanism is provided from the second end 19. The fixation element 3, in the form of a more or less circular plate, is fastened using, for example, three screws 12 and associated washers 14 on the second housing part 2. The mechanism is also known as a Frangibolt mechanism.

After the triggering of the release mechanism, the spring 10, which is pre-tensioned between the first and the second housing parts 1, 2, is activated, i.e., the spring 10 presses the housing parts 1, 2 away from one another against the force of the wires 6, 7, 16, thereby forming the gap identified with the reference sign 22. This operating configuration is shown in the figures. Each of the wires 6, 7, 16 can now be controlled in its length via its specific resistance in the above-described power circuit.

The change of the length of one or more of the wires 6, 7, 16 results, via the rocker function of the spring 10, in pivoting of the second housing part 2 in relation to the first housing part 1 and therefore an alignment of the fastening plane 33.

In relation to a conventional device for aligning a useful component, the described device has a large savings in mass. Since only a few electronic components are required (measurement of the resistance of the wires), a low level of complexity of the mechatronic system results. The use of wires made of a shape-memory alloy enables a high level of mechanical energy introduction on the least possible structural space.

The device has a high level of robustness and reliability.

The alignment of the second housing part 2 in relation to the first housing part 1 can also be performed in another manner. For this purpose, additionally or alternatively to the centrally arranged spring 10, a cone-socket connection element can be provided. Such a configuration is not shown in the figures.

If, in a first alternative variant, a centrally arranged cone-socket connection element is provided, two wires, which are arranged offset to one another at a 90° angle on a circle around the longitudinal axis, are thus provided. The second housing part 2 is tilted about the longitudinal axis 17 via the cone-socket connection element in the center. The tilting about one of the two axes, which lies perpendicular to the longitudinal axis and, in the event of known alignment, in the fastening plane 35, is achieved by a contracting wire, wherein this is counteracted by one spring in equal lever ratio on the opposite side. This principle acts about both axes. This means that a spring element is associated with each wire on the opposite side.

In a second alternative embodiment, a centrally arranged cone-socket connection element and four wires in a 90° arrangement on a circle about the longitudinal axis 17 are provided. The system is held in the starting configuration via the screwed-together release mechanism. In this case, however, the housing parts are not moved into contact. The bolt 9 is cut through such that it can tilt with the shaft 3 into its envelope cylinder. Each two wires are connected to one another in equal lever ratio as a lever via the central cone-socket connection element. These wires operate antagonistically. In this case, the applied voltage can be interrupted in any arbitrary position. In this way, unpowered operation results.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE SIGNS 1 first (lower) housing part
2 second (upper) housing part
3 fixation element for Frangibolt mechanism
4 housing of the release mechanism 9 (Frangibolt housing)
5 actuator of the release mechanism 9 (Frangibolt actuator)
6 SMA wire
7 SMA wire
8 threaded pin
9 release mechanism (bolt)
10 spring
11 screw
12 screw
13 washer
14 washer
15 washer
16 SMA wire
17 longitudinal axis
18 first end
19 second end
20 connection line
21 power source
22 gap
23 channel for SMA wire
24 recess
25 wall, peripheral
26 bottom of the recess 24
27 recess in the bottom 26 for receiving/guiding the spring 10
28 projection
29 recess in the projection 28 for receiving/guiding the spring 10
30 projection for receiving and fixing a wire
31 projection for receiving and fixing a wire
32 inclination axis
33 fastening plane, perpendicular to the longitudinal axis 17, for fastening on useful component
34 inclined plane, perpendicular to the inclination axis 32, for fastening on useful component
35 fastening plane, perpendicular to the longitudinal axis 17, for fastening on carrier
36 tilting device
37 angle
38 recess
39 top side
40 nut or bolt head

What is claimed is:

1. A device for holding and aligning a component, the device comprising:
   a first housing part arranged on a first end of the device and configured for stationary arrangement on a space vehicle;
   a second housing part arranged on a second end of the device and configured for connection to the component, wherein the first end and the second end of the device rest on opposite sides of the device with respect to a longitudinal axis; and a tilting device, which mechanically connects the first and the second housing parts to one another and provides a defined alignment and holding of a relative position of the second housing part in relation to the first housing part, wherein an actuator of the tilting device comprises a number of wires made of a shape-memory alloy, wherein a length of each of the number of wires is individually adjustable by a respective determination of a resistance of the respective wire, which is processed as a control variable in a control loop, and wherein the first and the second housing parts are connected to one another via a release mechanism, which, in a starting configuration, rigidly connects the first and the second housing parts to one another to block relative movement of the first and the second housing parts and, in an operating configuration, allows relative movement of the first and the second housing parts.

2. The device of claim 1, wherein each of the number of wires are mechanically fixedly connected to the first and the second housing parts.

3. The device of claim 1, wherein the number of wires consist of a nickel-titanium alloy (NiTi).

4. The device of claim 1, wherein the number of wires is arranged in parallel to the longitudinal axis of the device.

5. The device of claim 1, wherein the number of wires are of equal thickness.

6. The device of claim 1, wherein the tilting device comprises
at least one spring configured to press the first and the second housing parts away from one another.

7. The device of claim 1, wherein the first and the second housing parts are spaced apart from one another, at least in the operating configuration, via the tilting device.

8. The device of claim 1, wherein the number of wires is not tensioned in the starting configuration.

9. The device of claim 1, wherein, after triggering of the release mechanism, the at least one spring tensions the number of wires.

10. The device of claim 1, wherein the tilting device comprises a compression spring, which is pre-tensioned between the first and the second housing parts, and which is arranged centrally in the region of the longitudinal axis of the device.

11. The device of claim 10, wherein the tilting device comprises three wires arranged equidistantly on a circle about the longitudinal axis.

12. The device of claim 6, wherein the tilting device comprises two wires, wherein the two wires are arranged offset to one another by 90° on a circle about the longitudinal axis, and wherein each of the wires is associated with a spring, which is arranged opposite to the associated wire on a circle in relation to the longitudinal axis.

13. The device of claim 12, wherein the spring associated with a wire counteracts the wire located on the opposite side in a same lever ratio.

14. The device of claim 6, wherein the tilting device comprises four wires, which are distributed equidistantly on a circle about the longitudinal axis of the device.

* * * * *